(12) United States Patent
Yoon

(10) Patent No.: US 8,222,571 B2
(45) Date of Patent: Jul. 17, 2012

(54) APPARATUS FOR CURING ELECTROLYTE MEMBRANE OF FUEL CELL

(75) Inventor: Byung Kook Yoon, Seoul (KR)

(73) Assignees: Byung Kook Yoon, Seoul (KR); Nordson Sangsan Ltd., Gwangju (KR)

( * ) Notice: Subject to any disclaimer, the term of this patent is extended or adjusted under 35 U.S.C. 154(b) by 965 days.

(21) Appl. No.: 11/922,853

(22) PCT Filed: Sep. 29, 2006

(86) PCT No.: PCT/KR2006/003924
§ 371 (c)(1),
(2), (4) Date: Sep. 25, 2008

(87) PCT Pub. No.: WO2007/094544
PCT Pub. Date: Aug. 23, 2007

(65) Prior Publication Data
US 2009/0212036 A1    Aug. 27, 2009

(30) Foreign Application Priority Data

Feb. 15, 2006  (KR) .................. 10-2006-0014667

(51) Int. Cl.
*F27D 5/00*       (2006.01)
*H01M 8/10*       (2006.01)
(52) U.S. Cl. ........ 219/392; 219/526; 219/393; 219/521; 429/465; 429/470; 429/482; 429/483; 429/492; 429/510; 429/518

(58) Field of Classification Search .................. 219/392, 219/393, 521, 526; 429/465, 470, 482, 483, 429/492, 510, 518
See application file for complete search history.

(56) References Cited

U.S. PATENT DOCUMENTS

| 6,495,278 | B1 | 12/2002 | Schmid et al. |
| 2003/0199652 | A1 | 10/2003 | Deviny et al. |
| 2005/0276913 | A1 | 12/2005 | Chen et al. |

FOREIGN PATENT DOCUMENTS

| WO | WO-2005/074060 A1 | 8/2005 |
| WO | WO-2005/080483 A1 | 9/2005 |

*Primary Examiner* — Shawntina Fuqua
(74) *Attorney, Agent, or Firm* — Birch, Stewart, Kolasch & Birch, LLP

(57) ABSTRACT

An apparatus for curing an electrolyte membrane of a fuel cell is disclosed, by which curing can be performed by preventing a surface of an electrolyte layer from swelling. The present invention includes an oven body, a vacuum sucking plate entering the oven body while the electrolyte membrane having an electro-catalyst liquid sprayed thereon is attached to an upper surface of the vacuum sucking plate, a magazine provided within the oven body to sequentially load a plurality of vacuum sucking plates to enter the oven body in a horizontal state, and an air-sucking terminal provided to a rear side of the magazine to sustain a vacuum state of the vacuum sucking plate by being connected to the vacuum sucking plate loaded in the magazine.

13 Claims, 8 Drawing Sheets

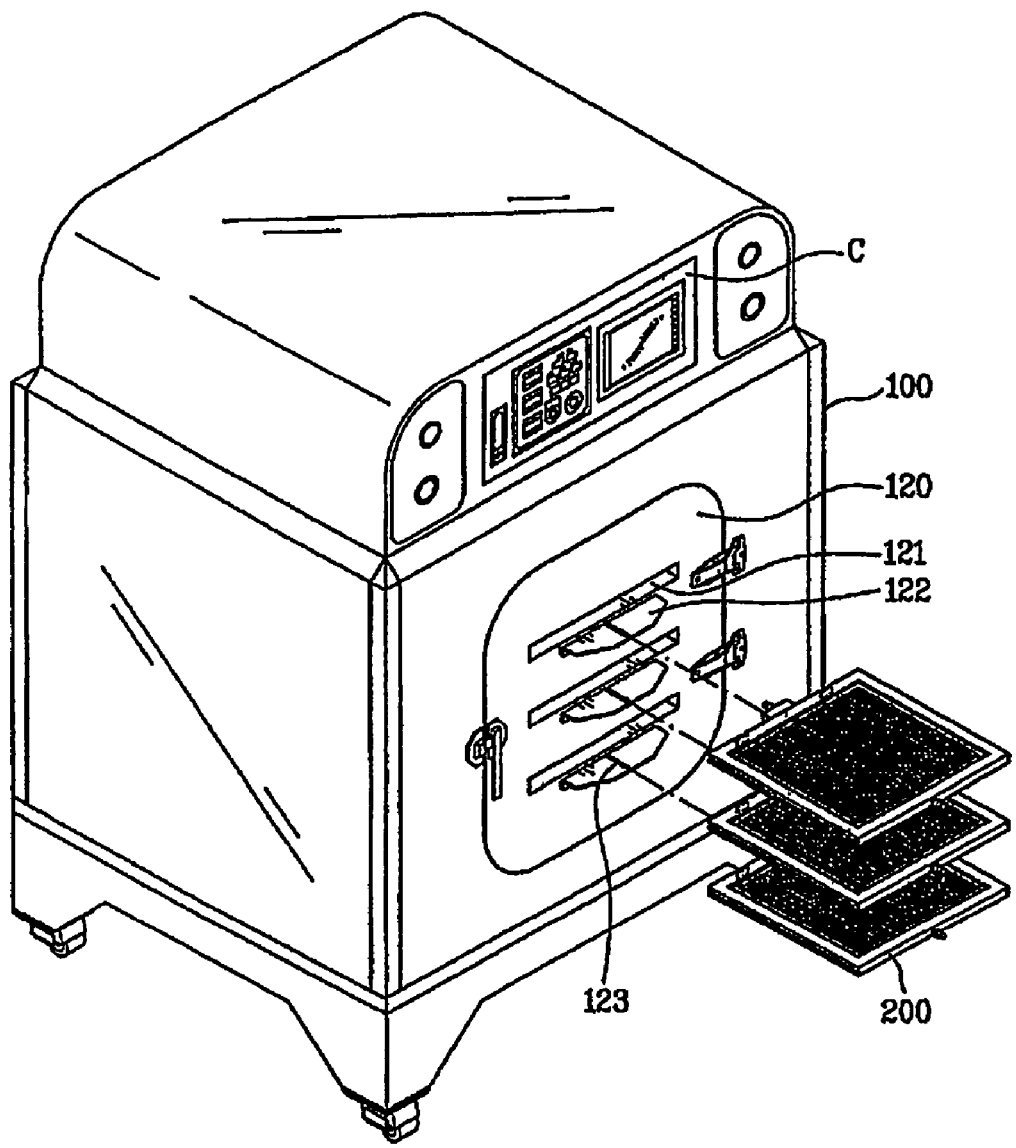
[Fig. 1]

[Fig. 2]
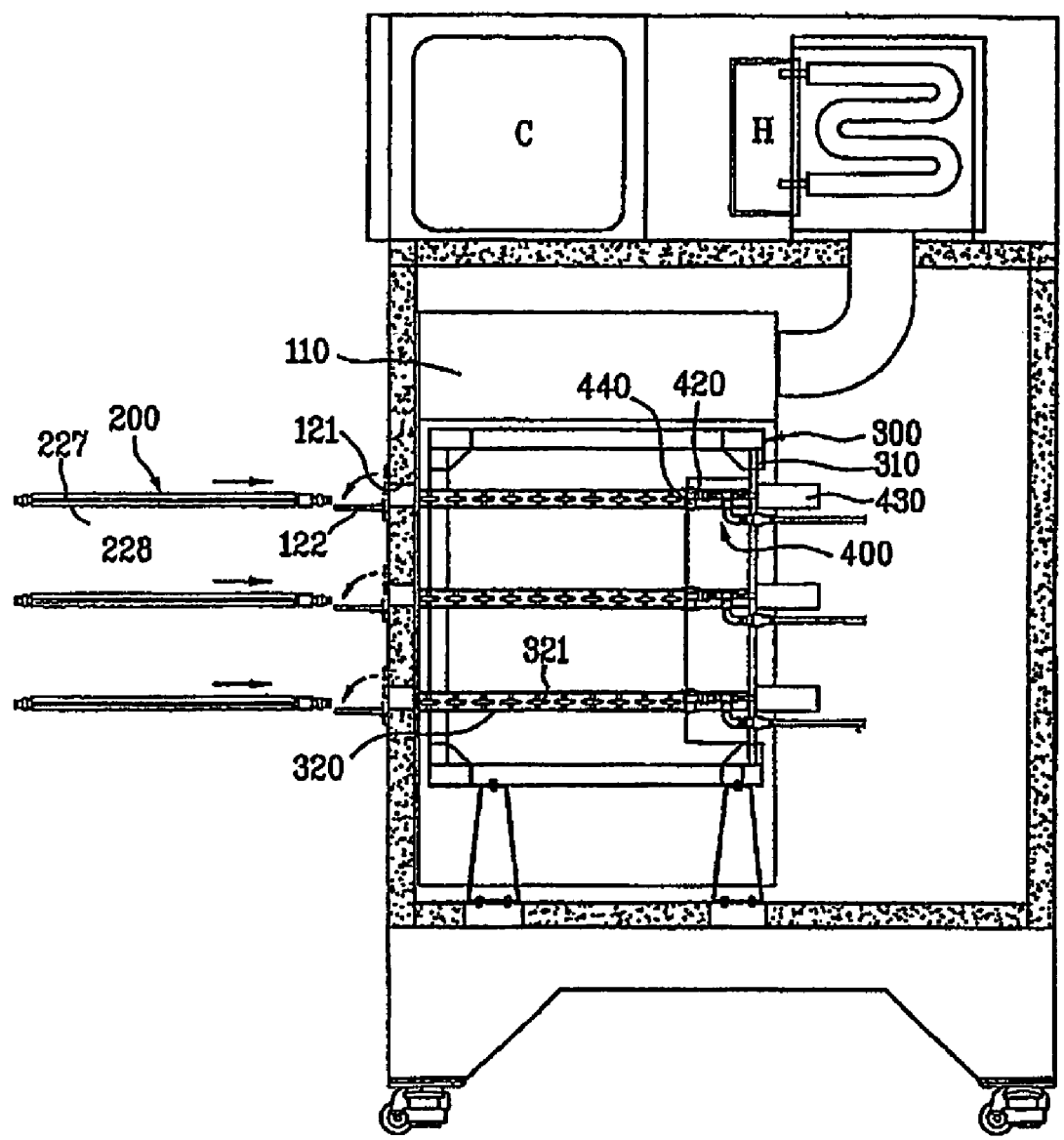

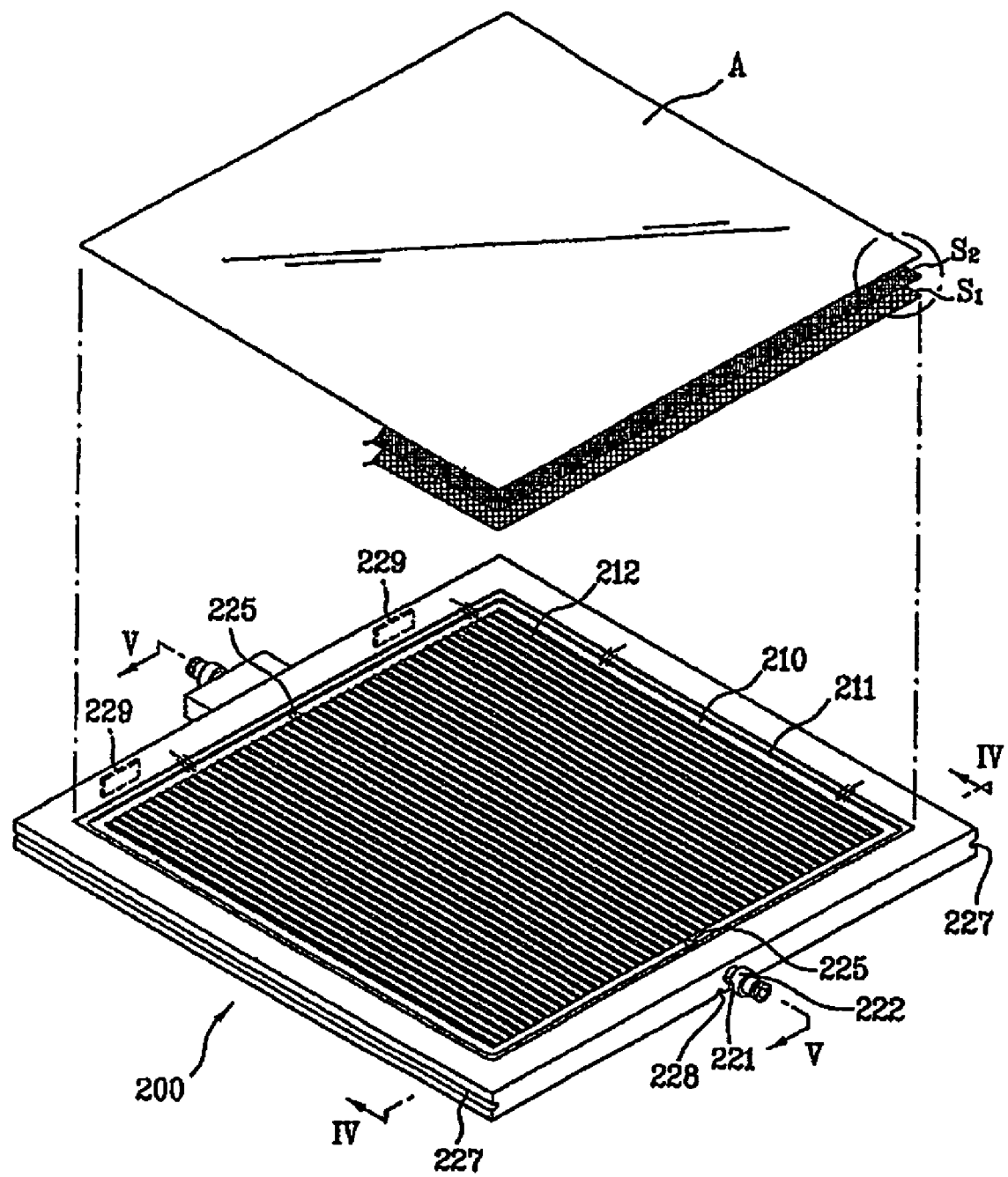
[Fig. 3]

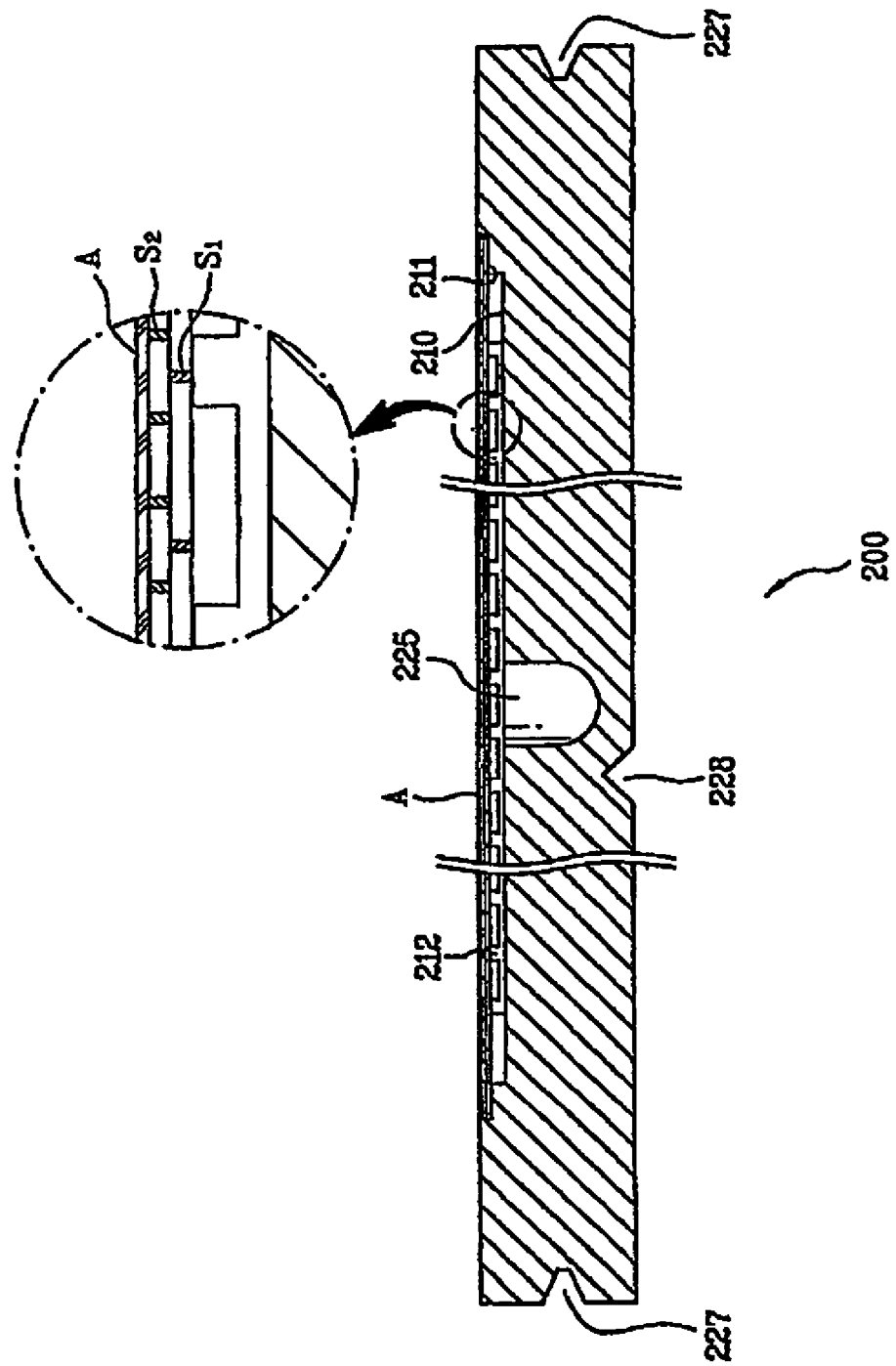
[Fig. 4]

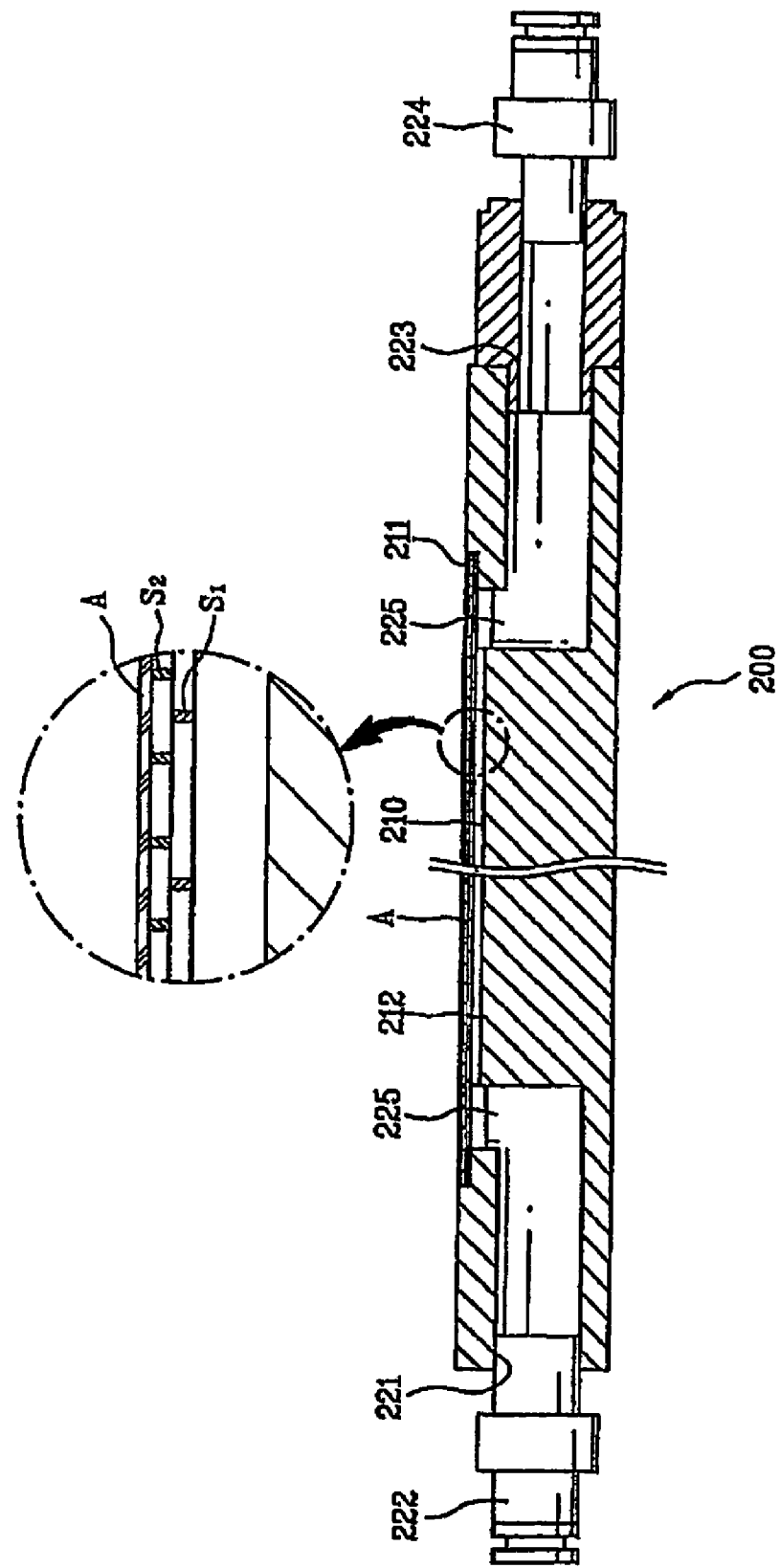
[Fig. 5]

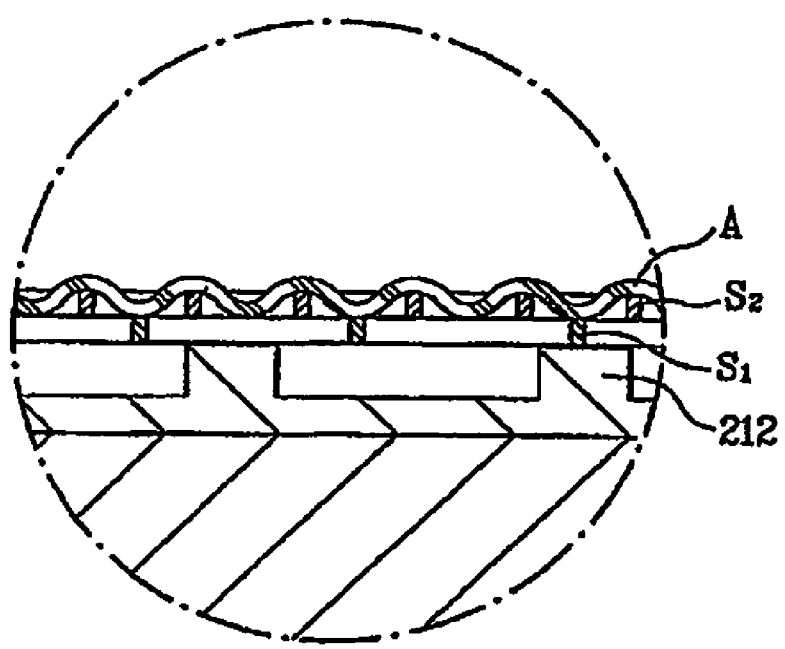
[Fig. 6]

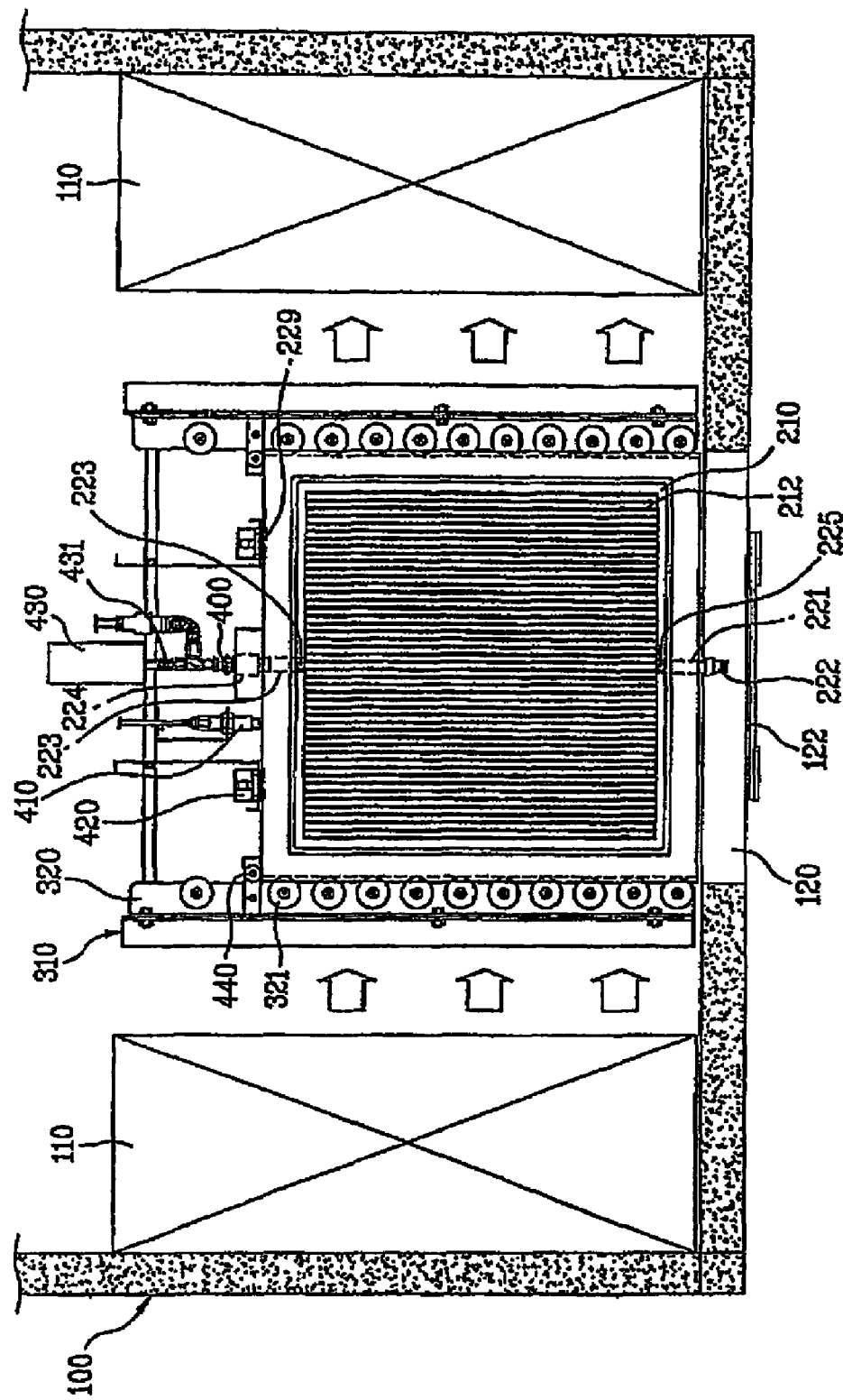
[Fig. 7]

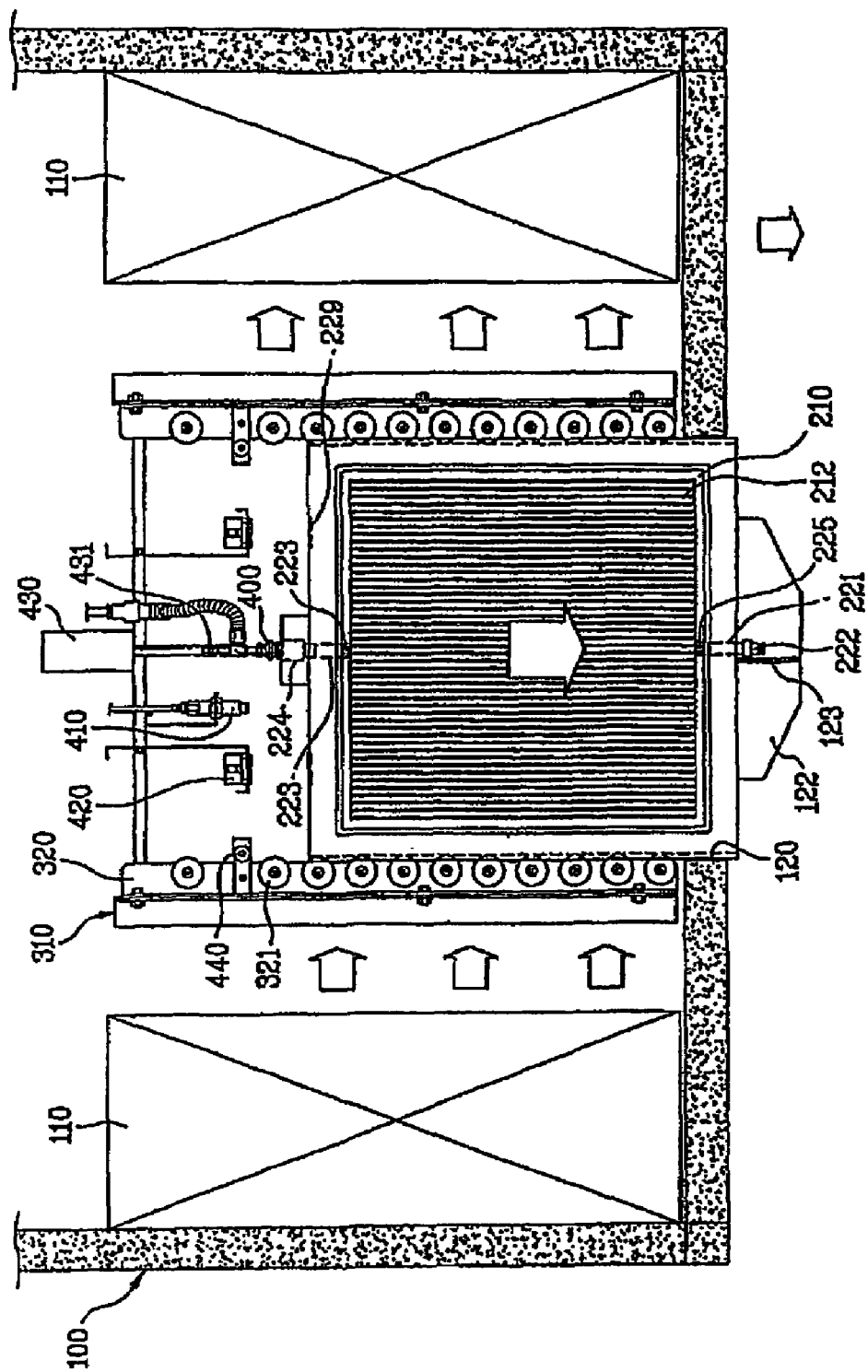
[Fig. 8]

APPARATUS FOR CURING ELECTROLYTE MEMBRANE OF FUEL CELL

TECHNICAL FIELD

The present invention relates to an electrolyte membrane curing apparatus in forming a fuel cell electrode. Although the present invention is An electricity generating material that directly converts hydrogen contained in a hydrocarbon-series fuel such as methanol, natural petroleum gas and the like and oxygen in air to electric energy by electrochemical reaction. Since the development of the fuel cell for a power supply of a spaceship by U.S.A. in 1970⊙, many efforts have been made to research and develop the fuel cell to use as a general power supply. And, the fuel cell has been currently developed for its practical use in such a country as U.S.A., Japan and the like (Ref.: J. Appleby, Assessment of research needs for advanced fuel cell, Energy Inter. J. vol. 11. no. 1/2. pp. 13-94, 1986).

Meanwhile, fuel cells are classified into a proton exchanges membrane type, a phosphoric acid type, a molten carbonate type, a solid oxide type and a direct methanol type. And, a proton exchanges membrane type along with a direct methanol type fuel cell is most advanced in the R & D and the technique for practical use for now.

Thus, a fuel cell main body playing the most important role of a proton exchanges membrane fuel cell power generating system includes a unit cell consisting of an anode and a cathode attached to both sides of an electrolyte layer including phosphoric acid, respectively. A plurality of unit cells are stacked over to configure a fuel cell power generating system capable of generating several tens kilowatts to several megawatts.

Performance of the proton exchanges membrane fuel cell depends on electrochemical properties of the respective elements configuring the fuel cell. And, it has been known that electrode performance plays an important role in the fuel cell power generating performance.

The electrode of the proton exchanges membrane fuel cell having considerable influence on the fuel cell performance consists of an electrolyte layer and an electro-catalyst layer. The electrolyte layer is formed of a porous thin layer, whereas the electro-catalyst layer includes porous gas diffusion electro-catalyst layers in which carbon particles coated with fine platinum particles are combined together by PTFE (polytetrafluoroethylene). And, the electrolyte layer plays a role in supplying reactive gas such as hydrogen and oxygen smoothly to the electro-catalyst layer for the electrochemical reaction of the fuel cell.

In forming an electrode of a proton exchanges membrane fuel cell, there is a related art transcription method consisting of the steps of pre-forming an electro-catalyst layer on a screen and transcribing the electro-catalyst layer to an electrolyte layer. Yet, in this method, cracks are easily generated in the electro-catalyst layer after the transcription. And, the electro-catalyst layer has poor adhesiveness to the electrolyte layer, thereby being easily peeled off. In particular, since it is very difficult to form microscopic pores to be formed in an electro-catalyst layer by the transcription method, a coating method is currently employed. In the coating method, an electro-catalyst layer is formed by directly spraying an electro-catalyst liquid on a surface of an electrolyte layer and is then cured in an oven.

DISCLOSURE

Technical Problem

However, the electrolyte layer formed of the porous thin layer is very sensitive to humidity. So, in fabricating the electrode by the coating method consisting of the step of spraying the electro-catalyst liquid to the electrolyte layer directly, a surface of the electrolyte layer gets wet by the electro-catalyst liquid to swell considerably.

Once the surface of the electrolyte layer swells, cracks are massively generated within the electro-catalyst layer to reduce performance of the fuel cell considerably. In particular, the surface swelling weakens the adhesiveness between the electrolyte layer and the electro-catalyst layer, whereby the electro-catalyst layer is easily peeled off from the electrolyte layer.

Hence, in order to avoid the direct influence on the performance of the fuel cell, it is very important that the surface of the electrolyte layer should be prevented from swelling in the course of curing the electrolyte layer wet by the electro-catalyst liquid.

Technical Solution

Accordingly, the present invention is directed to an apparatus for curing an electrolyte membrane of a fuel cell that substantially obviate one or more of the problems due to limitations and disadvantages of the related art.

An object of the present invention is to provide an apparatus for curing electrolyte membrane of the fuel cell that electro-catalyst liquid is directly applied at the coated electrolyte membrane swelling free.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an apparatus for curing an electrolyte membrane of a fuel cell according to the present invention includes an oven body, a vacuum sucking plate entering the oven body while the electrolyte membrane having an electro-catalyst liquid sprayed thereon is attached to an upper surface of the vacuum sucking plate, a magazine provided within the oven body to sequentially load a plurality of vacuum sucking plates to enter the oven body in a horizontal state, and an air-sucking terminal provided to a rear side of the magazine to sustain a vacuum state of the vacuum sucking plate by being connected to the vacuum sucking plate loaded in the magazine. Preferably, a landing recess is provided to an upper side of the vacuum sucking plate to have the electrolyte membrane supported thereon, vacuum ports are provided to front and rear sides of the vacuum sucking plate to have check valves fitted therein, respectively, and air-sucking holes are provided to the landing recess to communicate with the vacuum ports, respectively.

More preferably, a multitude of support protrusions are formed on a bottom of the landing recess of the vacuum sucking plate to horizontally support a lower side of the electrolyte membrane and a screen mesh is provided between the electrolyte membrane and a multitude of the support protrusions to form embossment on a surface of the electrolyte membrane. More preferably, the screen mesh includes a first screen mesh mounted on topsides of a multitude of the support protrusions of the vacuum sucking plate to support the electrolyte membrane and a second screen mesh including meshes smaller than those of the first screen mesh, the second screen mesh provided between the first screen mesh and the electrolyte membrane to form the embossment on the surface of the electrolyte membrane by adhering closely to a lower side of the electrolyte membrane that is adhering to the vacuum sucking plate by vacuum suction. More preferably, a size of each of the meshes of the second screen mesh is 55~65 microns.

Preferably, guide grooves are formed on both opposing sides of the vacuum sucking plate, respectively, guide rails are formed on both opposing sides of the magazine to guide both of the opposing sides of each of a plurality of the vacuum sucking plates to enter the magazine by being evenly spaced apart in parallel to each other, respectively, and a plurality of rollers are provided to the guide rails to rotatably move along a moving direction of the vacuum sucking plate by coming into contact with the guide grooves of the vacuum sucking plate. Preferably, the apparatus further includes a stopper provided to the rear side of the magazine to keep the vacuum sucking plate from entering the oven body over a predetermined distance by coming into contact with a rear end of the vacuum sucking plate.

Preferably, a position sensor is provided to the rear side of the magazine to detect whether the vacuum sucking plate is completely loaded in the magazine. Preferably, the apparatus further includes a magnet holder provided to the rear side of the magazine to tightly hold the vacuum sucking plate loaded in the magazine.

Preferably, the apparatus further includes a plurality of vacuum sucking plate entrances provided to a front side of the oven body to enable the vacuum sucking plate to enter the magazine, each having a height equal to a magazine loading height of the vacuum sucking plate.

More preferably, a guide shelf is further provided below each of a plurality of the vacuum sucking plate entrances to support a lower side of the vacuum sucking plate that is entering the corresponding vacuum sucking plate entrance. And, a guide projection and a guide groove portion are provided to an upper surface of the guide shelf and a bottom of the vacuum sucking plate in an entering direction of the vacuum sucking plate, respectively to guide a precise entering position of the vacuum sucking plate.

More preferably, an air cylinder is provided to the rear side of the magazine to externally withdraw a front end of the vacuum sucking plate via the corresponding entrance by enabling a cylinder rod pulled out from a cylinder body to push a rear end of the vacuum sucking plate loaded in the magazine. More preferably, the air-sucking terminal is attached to an end portion of the cylinder rod of the air cylinder.

It is to be understood that both the foregoing general description and the following detailed description are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.
In the drawings:

FIG. 1 is a perspective diagram of an apparatus for curing an electrolyte membrane of a fuel cell according to the present invention;

FIG. 2 is a cross-sectional diagram of an apparatus for curing an electrolyte membrane of a fuel cell according to the present invention;

FIG. 3 is an exploded perspective diagram of a vacuum sucking plate and an electrolyte membrane according to the present invention, in which the electrolyte membrane is attached to the vacuum sucking plate;

FIG. 4 is a cross-sectional diagram of the vacuum sucking plate according to a cutting line IV-IV shown in FIG. 3;

FIG. 5 is a cross-sectional diagram of the vacuum sucking plate according to a cutting line V-V shown in FIG. 3;

FIG. 6 is a detailed diagram of FIG. 4, in which a second screen mesh forms embossment on an electrolyte membrane;

FIG. 7 is a cross-sectional diagram of an apparatus for curing an electrolyte membrane of a fuel cell according to the present invention, in which a vacuum sucking plate loaded on a magazine is shown; and FIG. 8 is a cross-sectional diagram of an apparatus for curing an electrolyte membrane of a fuel cell according to the present invention, in which a vacuum sucking plate withdrawn outside by an air cylinder after completion of curing is shown.

BEST MODE

Reference will now be made in detail to the preferred embodiments of the present invention, examples of which are illustrated in the accompanying drawings.

FIG. 1 is a perspective diagram of an apparatus for curing an electrolyte membrane of a fuel cell according to the present invention and FIG. 2 is a cross-sectional diagram of an apparatus for curing an electrolyte membrane of a fuel cell according to the present invention.

Referring to FIG. 1 and FIG. 2, an apparatus for curing an electrolyte membrane of a fuel cell according to the present invention includes an oven body 100, a vacuum sucking plate 200 put into the oven body 100 while an electrolyte membrane A, on which an electro-catalyst liquid is sprayed, is attached to an upper surface of the vacuum sucking body by vacuum suction, a magazine 300 provided within the oven body 100 to sequentially load vacuum sucking plates 200 therein in a horizontal state to put the vacuum sucking plates 200 into the oven body 100, and an air-sucking terminal 400 provided to a rear side of the magazine 300 to keep a vacuum state of the corresponding vacuum plate 200 by being connected to the corresponding vacuum plate 200 loaded in the magazine 300.

The oven body 100 is basically provided with a control unit C to automatically control various operations such as a heating operation and the like. IN order to prevent unnecessary consumption of energy, the oven body 100 is provided with a hot air plenum circulation system 110 provided to both inner sides of the oven body 100 to heat a specific area only by blowing hot air generated from a heater to an opposite side at a predetermined speed or higher (cf. FIG. 7). And, the vacuum sucking plate 200 is put into the oven body 100 via a door 120 provided to a front side of the oven body 100 while the electrolyte membrane A, on which the electro-catalyst liquid is sprayed, is attached to the upper surface of the vacuum sucking plate 200 by vacuum suction.

FIG. 3 is an exploded perspective diagram of a vacuum sucking plate and an electrolyte membrane according to the present invention, in which the electrolyte membrane is attached to the vacuum sucking plate, FIG. 4 is a cross-sectional diagram according to a cutting line IV-IV shown in FIG. 3, FIG. 5 is a cross-sectional diagram according to a cutting line V-V shown in FIG. 3, and FIG. 6 is a detailed diagram of FIG. 4, in which a second screen mesh forms embossment on an electrolyte membrane.

Referring to FIGS. 3 to 6, the vacuum sucking plate 200 is a flat panel provided with a pair of vacuum ports 221 and 223, in which check valves 222 and 224 are fitted, at its front and rear sides, respectively. And, a landing recess 210 is formed on an upper part of the vacuum sucking plate 200 to enable the electrolyte membrane A to land thereon.

A plurality of support protrusions 212 are formed smaller than a depth of the landing recess 210 from a bottom of the landing recess 210 to horizontally support a bottom part of the electrolyte membrane A.

And, a step sill 211 is projected inward along edges of the landing recess 210 to horizontally support the bottom of the electrolyte membrane A. And, the step sill 211 has topside of which height is equal to that of an upper end of each of the support protrusions 212.

Hence, the electrolyte membrane A can be horizontally supported by the landing recess 210 through the step sill 211 and the support protrusions 212. And, air sucking holes 225 are formed to upper front and rear sides of the landing recess 210 to communicate with the vacuum ports 221 and 223, respectively. The vacuum ports 221 and 223 and the air-sucking hole 225 configure passes to externally discharge air existing between the landing recess 210 and the electrolyte membrane A.

Moreover, a screen mesh S to form embossment on a surface of electrolyte membrane A is further provided between the electrolyte membrane A and the support protrusions 212.

The screen mesh S includes a first screen mesh S1 mounted on the step sill 211 and the support protrusions 212 and a second screen mesh S2 provided between the first screen mesh S1 and the electrolyte membrane A to adhere closely to a lower surface of the electrolyte membrane A while the electrolyte membrane A is attached to the vacuum sucking plate 200 by vacuum suction. The first screen mesh S1 includes a multitude of meshes each of which is larger than that of the second screen mesh S2, thereby being able to securely support the second screen mesh S2 and the electrolyte membrane A. In particular, the second screen mesh S2 includes a multitude of fine meshes, each of which size corresponds to 55~65 microns. When the vacuum sucking plate 200 holds the electrolyte membrane A by vacuum suction, the second screen mesh S2 comes into adhering closely to the lower surface of the electrolyte membrane A, whereby embossment is formed on the surface of the electrolyte membrane A. The support protrusions 212 formed on the surface of the landing recess 210 of the vacuum sucking plate 200 enable the electrolyte membrane A and the first screen mesh S1 to be spaced apart from a bottom surface of the vacuum sucking plate 200. Hence, when the electrolyte membrane A undergoes the vacuum suction, the support protrusions 212 secure the spaces for vacuumizing and securely support the first screen mesh S1 stably.

And, guide grooves 227 are formed on both lateral sides of the vacuum sucking plate 200, respectively. The guide grooves 227 facilitate the vacuum sucking plate to be smoothly loaded in the magazine 300 to be provided within the oven body 100.

FIG. 7 is a cross-sectional diagram of an apparatus for curing an electrolyte membrane of a fuel cell according to the present invention, in which a vacuum sucking plate loaded on a magazine is shown and FIG. 8 is a cross-sectional diagram of an apparatus for curing an electrolyte membrane of a fuel cell according to the present invention, in which a vacuum sucking plate withdrawn outside by an air cylinder after completion of curing is shown.

Referring to FIG. 2, FIG. 7 and FIG. 8, the magazine 300 to be provided within the oven body 100 includes a base frame 310 fixed to a bottom of the oven body 100 to form a basic shape of the magazine 300 and guide rails 320 horizontally fixed to both sides of the base frame 310 in a front-to-rear direction of the oven body 100 to leave predetermined gaps between both of the sides of the base frame 320, respectively and to facilitate the vacuum sucking plate 200 to be loaded/unloaded and to be stably supported and loaded within base frame 310.

A plurality of rollers 321 are provided to each of the guide rails 320 to be rotatable along a moving direction of the vacuum sucking plate 200 while coming into contact with the guide grooves 227 of the vacuum sucking plate 200. So, the guide rails 320 facilitate the vacuum sucking plates 200 to be sequentially loaded in the oven body 100.

An air-sucking terminal 400 is provided to a rear side of the magazine 300 to come into contact with each of the vacuum sucking plates 200 loaded in the magazine 300. The air-sucking terminal 400 is connected to the check valve 224 provided to the rear side of the vacuum sucking plate 200 to keep a vacuum state of the vacuum sucking plate 200.

Meanwhile, a position sensor 410 can be further provided to the rear side of the magazine 300 to detect whether the vacuum sucking plate 200 is completely loaded in the magazine 300. The position sensor 410 detects rear end of the vacuum sucking plate 200 loaded in the magazine 300. And, a control unit C receives a signal from the position sensor 410 and then decides whether the vacuum sucking plate 200 is completely loaded in the magazine 300. If the control unit C decides that the vacuum sucking plate 200 is completely loaded in the magazine 300, the vacuum power becomes initiated.

Preferably, a magnet holder 420 tightly holding the vacuum sucking plate 200 by magnetism is further provided to the rear side of the magazine 300 to prevent the vacuum sucking plate 200 loaded in the magazine 300 from fluctuating. In this case, a magnetic piece 229 having magnetism is attached to a rear side of the vacuum sucking plate 200 coming into contact with the magnet holder 420.

A plurality of entrances 121 are further provided to the front side of the door 120 of the oven body 100 to enable the vacuum sucking plates 200 to enter the magazine 300, respectively. In this case, each of the entrances 121 has a height equal to a corresponding vacuum sucking plate loading height of the magazine 300.

Preferably, a guide shelf 122 can be further provided below the corresponding entrance 121 to support a bottom of the vacuum sucking plate 200 that is entering the magazine 300.

More preferably, a guide projection 123 and a guide groove portion 228 are provided to an upper surface of the guide shelf 122 and a lower surface of the corresponding vacuum sucking plate 200, respectively to guide a precise entering position of the corresponding vacuum sucking plate 200.

And, a horizontal portion of the guide shelf 122 is provided to turn upwardly, thereby being able to block the corresponding entrance 121 in performing the curing process.

Preferably, an air cylinder 430 is further provided to the rear side of the magazine 300 to externally discharge a front end of the vacuum sucking plate 200 via the corresponding entrance 121 by enabling a cylinder rod 431 pulled out from a cylinder body to push a rear end of the corresponding vacuum sucking plate 200 loaded in the magazine 300.

In this case, an end portion of the cylinder rod 431 of the air cylinder 430 can be installed to directly push the rear end of the corresponding vacuum sucking plate 200.

Alternatively, like the present embodiment, the air-sucking terminal 400 can be attached to the end portion of the cylinder rod 431.

Preferably, a stopper 440 can be further provided to the rear side of the magazine 300 to protect the air-sucking terminal 400, the position sensor 410, the magnet holder 420 and the air cylinder 430 provided to the rear side of the magazine 300 by contacting with the rear end of the vacuum sucking plate 200 in a manner of preventing the corresponding vacuum sucking plate 200 from entering the oven body 100 over a predetermined distance.

Meanwhile, a process for curing the electrolyte membrane A with the above-configured apparatus of the present invention is explained as follows.

First of all, once the oven body 100 is heated at a temperature suitable for curing by a heater actuated by a user, the vacuum sucking plate 200 is pushed to be loaded in the oven body 100 via the entrance 121.

In this case, the electrolyte membrane A has adhered to the landing recess 210 of the vacuum sucking plate 200 by vacuum suction. And, the electrolyte membrane A comes into adhering to the vacuum sucking plate 200 in a following manner.

First of all, the vacuum sucking plate 200 is prepared in advance in such a manner that the first screen mesh S1 and the second screen mesh S2 are sequentially mounted on the landing recess 210. The user places the electrolyte membrane A on which the electro-catalyst liquid has been sprayed on the second screen mesh S2 of the prepared vacuum sucking plate 200.

Subsequently, a prepared sucking device (not shown in the drawing) is connected to the check valve 222 fitted into the vacuum port 221 at the front side of the vacuum sucking plate 200.

After completion of the connection of the sucking device, the sucking device is driven to externally discharge the entire air existing between the electrolyte membrane A, the first and second screen meshes S1 and S2 and the bottom surface of the vacuum sucking plate 200. In doing so, the check valve 224 fitted into the vacuum port 223 at the rear side of the vacuum sucking plate 200 is turned off.

Once the vacuum state is achieved between the vacuum sucking plate 200 and the electrolyte membrane A through the above procedure, the sucking device is detached from the check valve 222. In this case, since the check valve 222 is automatically turned off as soon as being detached from the sucking device, the vacuum state of the electrolyte membrane A can be maintained intact until the check valve 224 in rear of the vacuum sucking plate 100 becomes open by coming into engage with the air-sucking terminal 400.

Hence, as the electrolyte membrane A is kept spread tightly across the support protrusions 212 and the step sill 211 of the landing recess 210 of the vacuum sucking plate 200 by a strong vacuum sucking force of the vacuum sucking plate 200, a surface of the electrolyte membrane A can be prevented from swelling due to the humidity of the electro-catalyst liquid sprayed on the surface of the electrolyte membrane A.

Moreover, since the surface of the electrolyte membrane A adheres closely to the second screen mesh S2 by penetrating the meshes of the second screen mesh S2 while the electrolyte membrane A adheres to the vacuum sucking plate 200 by vacuum suction, a multitude of embossments are formed on the surface of the electrolyte membrane A. In doing so, the support protrusions 212 of the vacuum sucking plate 200 secures eventually the space of vacuumization and stably supports the first screen mesh S in a horizontal state to prevent the electrolyte membrane A and the second screen mesh S2 from drooping downward.

Once the embossment is formed on the surface of the electrolyte membrane A, the surface of the electrolyte membrane A is extended as a result of the embossment formation. Hence, electricity generating performance can be considerably enhanced.

According to the above procedure, once the vacuum sucking plate 200 enters the entrance 121 of the oven body 100 while having the electrolyte membrane A attached thereto by vacuum suction, the guide grooves 227 provided to both of the opposing sides of the vacuum sucking plate 200 engage with the guide rails 320 of the magazine 300 provided within the oven body 100, respectively to enable the vacuum sucking plate 200 to slide inside the magazine 300. Thus, the vacuum sucking plate 200 can be loaded into the magazine 300 by maintaining its horizontal level.

In particular, once the vacuum sucking plate 200 enters the oven body 100, the rollers 321 provided to the guide rails 320 are fitted into the guide grooves 227 provided to both of the opposing sides of the vacuum sucking plate 200 to engage together in a horizontal level. While maintaining this state, the vacuum sucking plate 200 slides along the guide rails 320 to horizontally enter the magazine 300 by rotating the rollers 321 in an entering direction by an externally applied pushing force.

In this case, the user facilitates the entering operation of the vacuum sucking plate 200 in a considerably stable state using the shelf 122 provided to a lower end of the entrance 121.

While the guide projection 123 provided to the upper surface of the shelf 122 engage with the guide groove portion 228 formed on the lower surface of the vacuum sucking plate 200, if the entry of the vacuum sucking plate 200 is achieved, the vacuum sucking plate 200 is able to maintain its precise entry posture by avoiding its fluctuation in its entry process.

Besides, since it is able to automatically decide the entry position that the guide recesses 227 of the vacuum sucking plate 200 precisely engage with the rollers 321 of the guide rails 320, the entry work of the vacuum sucking plate 200 is considerably facilitated.

Meanwhile, as the vacuum sucking plate 200 arrives at the position for being normally loaded in the magazine 300 via the entrance 121 along the guide rails, the entry of the vacuum sucking plate 200 is interrupted by the stopper 440. At the same time, the check valve 224 fitted into the vacuum port 223 at the rear end of the vacuum sucking plate 200 is turned on by engaging with the air-sucking terminal 400.

So, as the air between the vacuum sucking plate 200 and the electrolyte membrane A is externally discharged via the air-sucking terminal 400, the vacuum state between the electrolyte membrane A and the vacuum sucking plate 200 can be sustained all the way through the curing process.

Thus, the vacuum power by connecting the air-sucking terminal 400 to the vacuum sucking plate 200 and having entered the vacuum state is able to prevent the release of the vacuum state between the electrolyte membrane A and the vacuum sucking plate 200 after duration. In this case, the release of the vacuum state is attributed to the electrolyte membrane A including a porous thin layer.

So, since the vacuum sucking state between the electrolyte membrane A and the vacuum sucking plate 200 is sustained through the entire course of the curing, it is able to prevent the surface of the electrolyte membrane A from swelling. Meanwhile, the position sensor 410 provided to the rear side of the magazine 300 detects vacuum sucking plate 200 completely loaded and the vacuum sucking plate 200 delivers a corresponding result to the control unit C. Subsequently, the control unit C obtains a position of the vacuum sucking plate 200 detected by the position sensor 410 and then decides whether the corresponding vacuum sucking plate 200 is normally loaded within the magazine 300.

In case of deciding that the corresponding vacuum sucking plate 200 is normally loaded within the magazine 300, the control unit C executes a curing work by driving the heater on a pre-programmed condition.

Subsequently, the user turns the shelf 122 upward to block the entrance. If so, hot air within the oven body 100 is prevented from being externally discharged via the entrance 121. Hence, total heat efficiency of the oven body 100 can be raised and the shelf 122 is prevented from being outwardly projected to prevent the equipment breakage and the safety accident.

According to the present invention, the hot air plenum circulation system is provided to both sides of the magazine 300 to configure an internal circulation path via which the hot air generated from the heater can pass through the magazine loaded with the vacuum sucking plate 200 only. Hence, it is able to prevent an unnecessary area within the oven body 100 from being heated and to maximize heating efficiency.

The magnet holder 420 provided to the rear side of the magazine 300 is attached to the magnetic piece 229 of the vacuum sucking plate 200 to enable the vacuum sucking plate 200 to be stably fixed within the magazine without fluctuation. This is to prevent a position of the vacuum sucking plate 200 normally loaded in the magazine 300 from varying due to a small external shock or movement since the vacuum sucking plate 200 is configured to smoothly move back and forth along the rollers 321 of the guide rails 320.

Through the above procedures, the curing of the electrolyte membrane A is completed.

If the cylinder rod 431 of the air cylinder 430 is pulled out from the air cylinder 430, the vacuum sucking plate 200 is pushed by the cylinder rod 431 of the air cylinder 430 to be externally withdrawn via the entrance 121 by being separated from the magnet holder 420.

In this procedure, the shelf 122 blocking the entrance 121 is pushed by the front end (check valve 222) of the withdrawn vacuum sucking plate 200. If so, the shelf 122 is downwardly turned to open the entrance and then supports the bottom of the vacuum sucking plate 200 withdrawn via the entrance 121. Simultaneously, the vacuum sucking plate 200 releases the engaging state between the air-sucking terminal 400 and the check valve 224. The check valve 224 is automatically closed as soon as the engagement with the air-sucking terminal 400 is released, thereby sustaining the vacuum state of the vacuum sucking plate 200.

[Industrial Applicability]

Accordingly, the present invention provides the following effects or advantages. First of all, the curing process is carried out while the electrolyte membrane is attached to the vacuum sucking plate by vacuum suction. The present invention is able to prevent the electrolyte membrane surface from swelling that may occur because the electro-catalyst liquid sprayed on the electrolyte membrane is cured by the heat generated from the curing process.

Secondly, the screen mesh is postured beneath the electrolyte membrane to form the embossment on the surface of the electrolyte membrane in the course of the vacuum suction. Hence, the present invention maximizes the surface area of the electrolyte membrane, thereby enhancing the electricity generating performance considerably.

Thirdly, the present invention reduces unnecessary energy consumption by providing the hot air plenum circulation system to both inner sides of the oven body to enable the hot air generated from the heater to pass through the magazine loaded with the vacuum sucking plate only, thereby maximizing apparatus energy efficiency.

Finally, by providing the entrances to the front side of the oven body and installing the guide rails on both sides of the magazine, the present invention facilitates the vacuum sucking plate to be simply loaded in the magazine.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. An apparatus for curing an electrolyte membrane of a fuel cell, comprising:
   an oven body;
   a vacuum sucking plate entering the oven body while the electrolyte membrane having an electro-catalyst liquid sprayed thereon is attached to an upper surface of the vacuum sucking plate;
   a magazine provided within the oven body to sequentially load a plurality of vacuum sucking plates to enter the oven body in a horizontal state; and
   an air-sucking terminal provided to a rear side of the magazine to sustain a vacuum state of the vacuum sucking plate by being connected to the vacuum sucking plate loaded in the magazine.

2. The apparatus of claim 1, wherein a landing recess is provided to an upper side of the vacuum sucking plate to have the electrolyte membrane supported thereon, wherein vacuum ports are provided to front and rear sides of the vacuum sucking plate to have check valves fitted therein, respectively, and wherein air-sucking holes are provided to the landing recess to communicate with the vacuum ports, respectively.

3. The apparatus of claim 2, wherein a multitude of support protrusions are formed on a bottom of the landing recess of the vacuum sucking plate to horizontally support a lower side of the electrolyte membrane and wherein a screen mesh is provided between the electrolyte membrane and a multitude of the support protrusions to form embossment on a surface of the electrolyte membrane.

4. The apparatus of claim 3, the screen mesh comprising:
   a first screen mesh mounted on topsides of a multitude of the support protrusions of the vacuum sucking plate to support the electrolyte membrane; and
   a second screen mesh including meshes smaller than those of the first screen mesh, the second screen mesh provided between the first screen mesh and the electrolyte membrane to form the embossment on the surface of the electrolyte membrane by adhering closely to a lower side of the electrolyte membrane that is adhering to the vacuum sucking plate by vacuum suction.

5. The apparatus of claim 4, wherein a size of each of the meshes of the second screen mesh is 55~65 microns.

6. The apparatus of claim 1, wherein guide grooves are formed on both opposing sides of the vacuum sucking plate, respectively, wherein guide rails are formed on both opposing sides of the magazine to guide both of the opposing sides of each of a plurality of the vacuum sucking plates to enter the magazine by being evenly spaced apart in parallel to each other, respectively, and wherein a plurality of rollers are provided to the guide rails to rotatably move along a moving direction of the vacuum sucking plate by coming into contact with the guide grooves of the vacuum sucking plate.

7. The apparatus of claim 1, further comprising a stopper provided to the rear side of the magazine to keep the vacuum sucking plate from entering the oven body over a predetermined distance by coming into contact with a rear end of the vacuum sucking plate.

8. The apparatus of claim 1, wherein a position sensor is provided to the rear side of the magazine to detect whether the vacuum sucking plate is completely loaded in the magazine.

9. The apparatus of claim 1, further comprising a magnet holder provided to the rear side of the magazine to tightly hold the vacuum sucking plate loaded in the magazine.

10. The apparatus of claim 1, further comprising a plurality of vacuum sucking plate entrances provided to a front side of the oven body to enable the vacuum sucking plate to enter the magazine, each having a height equal to a magazine loading height of the vacuum sucking plate.

11. The apparatus of claim 10, wherein a guide shelf is further provided below each of a plurality of the vacuum sucking plate entrances to support a lower side of the vacuum sucking plate that is entering the corresponding vacuum sucking plate entrance and wherein a guide projection and a guide groove portion are provided to an upper surface of the guide shelf and a bottom of the vacuum sucking plate in an entering direction of the vacuum sucking plate, respectively to guide a precise entering position of the vacuum sucking plate.

12. The apparatus of claim 10, wherein an air cylinder is provided to the rear side of the magazine to externally withdraw a front end of the vacuum sucking plate via the corresponding entrance by enabling a cylinder rod pulled out from a cylinder body to push a rear end of the vacuum sucking plate loaded in the magazine.

13. The apparatus of claim 12, wherein the air-sucking terminal is attached to an end portion of the cylinder rod of the air cylinder.

* * * * *